United States Patent Office 3,132,179
Patented May 5, 1964

3,132,179
ETHERS OF α-HYDROXYMETHYL-β-MONOCARBOCYCLIC ARYL ETHYL AMINES AND THEIR PREPARATION
Robert L. Clarke, Bethlehem, N.Y., assignor to Sterling Drug Inc., New York, N.Y., a corporation of Delaware
No Drawing. Filed Aug. 27, 1959, Ser. No. 836,344
11 Claims. (Cl. 260—570.6)

This invention relates to new phenylethylamines and methods for the preparation thereof. In particular, the invention concerns α-$CH_2OY$-β-monocarbocyclicaryl ethyl amines wherein Y is an alkyl, cycloalkyl or monocarbocyclic aryl group.

β-Monocarbocyclicaryl ethyl amines substituted on the alpha carbon atom by an hydroxymethyl group are known. According to the present invention, new and useful compounds are obtained when a β-monocarbocyclicaryl ethyl amine grouping, that is, a radical of the benzene series attached to the β carbon atom of an ethyl amine, is attached through its alpha carbon atom by a methylene bridge to an alkoxy, cycloalkoxy or monocarbocyclic aryloxy group. The alkoxy group can have from one to eight carbon atoms; the cycloalkoxy group can have five or six ring carbon atoms; and the aryl portion of the aryloxy group can be unsubstituted phenyl or phenyl substituted by from one to three lower alkyl, lower-alkoxy or halogen groups. The phenyl ring and the nitrogen atom of the phenylethylamine moiety can be unsubstituted or substituted by one or more substituents inert to the conditions under which the compounds are prepared.

A preferred aspect of the invention relates to compounds having the formula

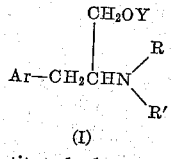

$$Ar-CH_2CHN\begin{matrix}CH_2OY\\R\\R'\end{matrix}$$

(I)

wherein Ar is unsubstituted phenyl or phenyl substituted by from one to three lower-alkyl or lower-alkoxy groups or halogen atoms having an atomic weight between 19 and 80, including fluorine, chlorine and bromine which groups or atoms may be the same or different; Y is a lower-alkyl group having from one to about eight carbon atoms, a cycloalkyl group having five to six ring carbon atoms, unsubstituted phenyl or phenyl substituted by from one to three lower-alkyl or middle halogen groups which may be the same or different and wherein the term middle halogen includes those halogens having an atomic weight between 35 and 80, i.e. chlorine and bromine; R is hydrogen or lower-alkyl; and R' is hydrogen, lower-alkyl or hydroxy-lower-alkyl.

In the above general Formula I, the aryl group Ar represents unsubstituted phenyl or phenyl substituted by from one to three lower-alkyl, lower-alkoxy or halogen groups. When the substituents on the phenyl ring are lower-alkyl or lower-alkoxy groups they can have from one to about six carbon atoms and thus include methyl, ethyl, propyl, isopropyl, butyl, isobutyl, tertiary-butyl, pentyl, isopentyl, hexyl, isohexyl, methoxy, ethoxy, propoxy, isopropoxy, butoxy, tertiary-butoxy, pentoxy, hexoxy, and the like. When the substituents on the phenyl ring are halogen atoms they can be either fluorine, chlorine or bromine.

The Y in the above general Formula I, when lower-alkyl, has from one to about eight carbon atoms and comprehends such radicals as methyl, ethyl, propyl, isopropyl, butyl, secondary-butyl, pentyl, isopentyl, hexyl, heptyl, octyl isooctyl, and the like. When Y is a cycloalkyl group it has five to six ring carbon atoms including cyclopentyl and cyclohexyl radicals. The Y in the above general Formula I can also be the unsubstituted phenyl radical and phenyl radicals substituted by from one to three lower-alkyl or middle halogen groups which can be in any of the available positions of the phenyl nucleus, and where more than one substituent is present, they can be the same or different and they can be in any of the various position combinations relative to each other. The halogen substituents have an atomic weight between 35 and 80 and hence include chlorine and bromine. The lower-alkyl substituents have preferably from one to six carbon atoms which can be arranged in a straight or branched chain, and include, for example, methyl, ethyl, propyl, isopropyl, butyl, tertiary-butyl, pentyl, hexyl, isohexyl and the like.

In the above general Formula I, R and R' are hydrogen or lower-alkyl groups which may be the same or different. When R and/or R' are lower-alkyl groups they can have from one to about six carbon atoms and thus include methyl, ethyl, propyl, isopropyl, butyl, isobutyl, pentyl, isopentyl, hexyl, isohexyl, and the like. Additionally R' can be an hydroxy-lower-alkyl group having from one to about four carbon atoms including, for example, hydroxymethyl, 2-hydroxyethyl, 3-hydroxypropyl, 2-hydroxypropyl, 4-hydroxybutyl, 3-hydroxybutyl, and the like.

A particularly preferred aspect of the invention relates to compounds wherein Ar is phenyl, Y is lower-alkyl having up to about eight carbon atoms, R is hydrogen and R' is lower-alkyl, preferably a methyl radical.

The compounds of the invention are prepared by reacting an oxyacetonitrile with an appropriate Grignard reagent and reducing the resulting ketone in the presence of ammonia or a primary amine. Although the N,N-disubstituted compounds can be prepared by reductive amination of the appropriate ketone with a secondary amine it is preferred to prepare such compounds by alkylation of N-monosubstituted compounds.

The process is carried out by hydrogenating a 1,3-disubstituted-2-propanone in the presence of a five to eight-fold excess of a lower-alkyl or hydroxy-lower-alkyl amine. The reaction is preferably carried out at a temperature between about 20° C. to 30° C. or room temperature in an organic solvent, inert under the conditions of the reaction, such as anhydrous methyl alcohol, ethyl alcohol, benzene, xylene and the like. The addition of hydrogen is carried out under about 40 to 80 pounds pressure in the presence of a platinum oxide catalyst. Hydrogen absorption is usually complete in from two to five hours after which period the catalyst is separated and the desired base freed from solvent.

The reductive amination of a 1,3-disubstituted-2-propanone with hydrogen and a lower-alkyl or hydroxy-lower-alkyl amine takes place under relatively mild conditions, a preferred method comprising bringing together the reactants at room temperature in anhydrous ethyl alcohol at 60 pounds pressure in the presence of a platinum oxide catalyst. The reaction of a 1,3-disubstituted-2-propanone with hydrogen and ammonia requires somewhat more vigorous conditions, a preferred method comprising heating the reactants to about 40° C. to 50° C. in absolute methyl alcohol under 800 to 1000 pounds pressure in the presence of a Raney nickel catalyst.

The intermediate 1,3-disubstituted-2-propanones are a known class of compounds. They can be prepared by reacting a substituted oxyacetonitrile with a benzyl or substituted benzyl magnesium halide.

The acid-addition salts and the quaternary ammonium salts of the bases herein described are the form in which the bases are most conveniently prepared for use and are the full equivalents of the subject matter specifically claimed. The preferred type of salts are water-soluble pharmacologically acceptable salts, that is, salts whose anions are innocuous to the animal organism in therapeutic doses of the salts, so that beneficial physiological properties inherent in the free bases are not vitiated by side-effects ascribable to the anions; in other words, the latter do not substantially affect the pharmacological properties inherent in the cations. In practicing the invention, it is convenient to employ the hydrochloride salts. However, other appropriate acid-addition salts are those derived from mineral acids such as hydrobromic acid, hydriodic acid, nitric acid, phosphoric and sulfuric acid; and organic acids such as acetic acid, citric acid, tartaric acid, lactic acid, quinic acid, methanesulfonic acid, ethanesulphonic acid, and the like, giving the hydrobromide, hydriodide, nitrate, phosphate or acid phosphate, sulfate or acid sulfate, acetate, citrate or acid citrate, tartrate or acid tartrate, lactate, quinate, methanesulfonate and ethanesulfonate salts, respectively. The quaternary ammonium salts are obtained by the addition of esters having a molecular weight less than about 200 to the free base form of the compounds. A preferred class of esters comprises lower-alkyl, lower-alkenyl or monocarbocyclic aryl-lower-alkyl esters of inorganic acids or organic sulfonic acids, and includes such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Although therapeutically acceptable salts are preferred, those having toxic anions are also useful. All acid-addition salts are useful as intermediates in purification of the free bases, and toxic acid-addition salts are useful as intermediates in preparing therapeutically acceptable salts by ion exchange procedures.

The structures of the compounds of the invention have been established by chemical analysis and by the processes for their preparation, which can only lead to compounds of the structure depicted above.

The following examples will further illustrate the invention, without the latter being limited thereto.

PREPARATION OF INTERMEDIATES

*n-Hexyloxyacetonitrile*

To 30.1 grams of dry cuprous cyanide was added 43.4 grams of chloromethyl n-hexyl ether over a period of twenty minutes. The mixture was heated with stirring for an additional thirty minutes, cooled and diluted with 75 ml. of ether. The solid material was removed by suction filtration and the filtrate distilled to give 26.8 grams of n-hexyloxyacetonitrile, B.P. 86–88° C. (6 mm.), $n_D^{25}=1.4187$.

*Analysis.*—Calcd. for $C_8H_{15}NO$: C, 68.05; H, 10.71; N, 9.92. Found: C, 68.07; H, 10.62; N, 9.85.

*Chloromethyl n-Hexyl Ether*

A mixture of 80 grams of n-hexyl alcohol and 65 grams of 35% formaldehyde was cooled in an ice bath and saturated with hydrogen chloride. The mixture was kept cold for three hours and at room temperature overnight. The organic layer was separated from the aqueous layer and distilled to give 84 grams of chloromethyl n-hexyl ether, B.P. 54–56° C. (6 mm.), $n_D^{25}=1.4278$.

*Analysis.*—Calcd. for $C_7H_{15}ClO$: C, 55.79; H, 10.03; Cl, 23.53. Found: C, 56.27; H, 10.16; Cl, 22.94.

*α-Chloro-o-Tolyl n-Propyl Ether*

A solution of 26.7 grams of o-propoxybenzyl alcohol in 75 ml. of dry ethyl ether at 0° C. was saturated with hydrogen chloride and kept cool for two hours. After standing overnight at room temperature the mixture was distilled to yield 15.8 grams of α-chloro-o-tolyl n-propyl ether, B.P. 110–111.5° C. (8 mm.); $n_D^{25}=1.5281$.

*Analysis.*—Calcd. for $C_{10}H_{13}ClO$: C, 65.02; H, 7.09; Cl, 19.20. Found: C, 64.92; H, 7.21; Cl, 19.27.

*α-Hydroxymethyl-N-Methylphenethylamine*

To a stirred suspension of 90 grams of N-formyl-β-phenylalanine in 1 liter of tetrahydrofuran was added a solution of 38 grams of lithium aluminum hydride in 750 ml. of tetrahydrofuran at a rate which produced controlled reflux. The mixture was refluxed for two hours, then treated dropwise with 90 ml. of water. After stirring for thirty minutes the inorganic salts were removed by suction filtration and the filtrate freed of solvent by distillation at reduced pressure. The residual oil was triturated with ether to give 48 grams of α-hydroxymethyl-N-methylphenethylamine, M.P. 67.5–69.5° C.

*Analysis.*—Calcd. for $C_{10}H_{15}NO$: C, 72.70; H, 9.15; N, 8.48. Found: C, 72.69; H, 8.87; N, 8.31.

*N,N-Dimethyl-α-Hydroxymethylphenethylamine*

A solution of 16.5 grams of α-hydroxymethyl-N-methylphenethylamine in 100 ml. of 90% formic acid and 40 ml. of 35% formaldehyde was heated on a steam bath for two hours. The solvent and excess reagents were removed by heating under diminished pressure and the residual oil refluxed with 50 ml. of concentrated hydrochloric acid for one and one-half hours. The acid was removed by warming in vacuo and the residue made strongly basic with 35% sodium hydroxide to liberate the free base which was extracted with ether. Distillation of the extract after removal of the ether gave 15.3 grams of N,N-dimethyl-α-hydroxymethylphenethylamine, B.P. 84–86.5° C. (0.04 mm.); $n_D^{25}=1.5222$.

*Analysis.*—Calcd. for $C_{11}H_{17}NO$: C, 73.68; H, 9.56; N, 7.81. Found: C, 73.82; H, 9.51; N, 7.72.

*1,3-Disubstituted-2-Propanones*

Grignard reagents were prepared by adding 0.32 mole of an appropriate benzyl chloride to 0.35 mole of magnesium powder in 250 ml. of anhydrous ether, and refluxing the mixture for one hour. To the Grignard reagent thus prepared was added 0.25 mole of the appropriate nitrile in 75 ml. of anhydrous ether. The mixture was refluxed for one hour, 175 ml. of 2 N hydrochloric acid added, and this mixture stirred vigorously for thirty minutes. The layers were separated, the ether layer dried over sodium sulfate and the solvent removed by vacuum distillation. Distillation of the residual oil gave the corresponding ketone.

Thus, benzyl magnesium chloride and isopropoxyacetonitrile gave 1-isopropoxy-3-phenyl-2-propanone, B.P. 118–125° C. (6 mm.); M.P. of 2,4-dinitrophenylhydrazone, 97–98° C.

*Analysis.*—Calcd. for $C_{18}H_{20}N_4O_5$: C, 58.05; H, 5.41; N, 15.05. Found: C, 57.88; H, 5.03; N, 15.53.

Benzyl magnesium chloride and n-butoxyacetonitrile gave 1-n-butoxy-3-phenyl-2-propanone, B.P. 140–142° C. (6 mm.); M.P. of 2,4-dinitrophenylhydrazone 108–109.5° C.

*Analysis.*—Calcd. for $C_{19}H_{24}N_4O_5$: C, 59.06; H, 5.74; N, 14.50. Found: C, 59.20; H, 5.32; N, 14.36.

Benzyl magnesium chloride and n-hexyloxyacetonitrile gave 1-n-hexyloxy-3-phenyl-2-propanone, B.P. 122–126° C. (0.7 mm.).

*Analysis.*—Calcd. for $C_{15}H_{22}O_2$: C, 76.89; H, 9.74. Found: C, 76.95; H, 9.37.

Benzyl magnesium chloride and n-octyloxyacetonitrile gave 1-n-octyloxy-3-phenyl-2-propanone, B.P. 137–140° C. (0.5 mm.).

*Analysis.*—Calcd. for $C_{17}H_{26}O_2$: C, 77.81; H, 9.99. Found: C, 77.35; H, 9.58.

α-Chloro-o-tolyl n-propyl ether and methoxyacetonitrile gave 1-methoxy-3-(2-propoxyphenyl)-2-propanone, B.P. 196–198.5° C. (0.02 mm.).

*Analysis.*—Calcd. for $C_{13}H_{18}O_3$: C, 70.24; H, 8.16. Found: C, 70.29; H, 7.95.

According to the manipulative procedure described above, 1 - (2,4-dibromophenoxy) - 3 - (4 - n - hexyloxyphenyl)-2-propanone can be prepared by heating 4-n-hexyloxybenzyl magnesium bromide with 2,4-dibromophenoxyacetonitrile; 1-(2-methyl-5-isopropylphenoxy)-3-(4-chlorophenyl)-2-propanone can be prepared by heating 4-chlorobenzyl magnesium chloride with 2-methyl-5-isopropylphenoxy acetonitrile; 1 - cyclopentyloxy - 3 - (3-n-butylphenyl)-2-propanone can be prepared by heating 3-n-butylbenzyl chloride with cyclopentyloxyacetonitrile; 1 - (2,4,5 - trichlorophenoxy) - 3 - (2,4,6 - trimethylphenyl)-2-propanone can be prepared by heating 2,4,6-trimethylbenzyl magnesium chloride with 2,4,5-trichlorophenoxyacetonitrile; 1 - (4 - isopropylphenoxy) - 3 - (2,4 - dibromophenyl)-2-propanone can be prepared by heating 2,4-dibromobenzyl magnesium chloride with 4-isopropylphenoxyacetonitrile; 1 - (3 - chloro - 4 - methylphenoxy) - 3-(2-butoxyphenyl)-2-propanone can be prepared by heating 2-butoxybenzyl magnesium chloride with 3-chloro-4-methylphenoxyacetonitrile; 1 - (4 - methylphenoxy) - 3 - (3-fluorophenyl)-2-propanone can be prepared by heating 3-fluorobenzyl magnesium bromide with 4-methylphenoxyacetonitrile; 1 - (2 - isopropylphenoxy) - 3 - (4-n-pentylphenyl)-2-propanone can be prepared by heating 4-n-pentylbenzyl magnesium chloride with 2-isopropylphenoxyacetonitrile; 1 - (2,6 - dimethylphenoxy) - 3 - (2,4-dimethoxyphenyl)-2-propanone can be prepared by heating 2,4-dimethoxybenzyl magnesium chloride with 2,6-dimethylphenoxyacetonitrile; and 1-(2-bromophenoxy-3-(2-fluorophenyl)-2-propanone can be prepared by heating 2-fluorobenzyl magnesium bromide with 2-bromophenoxyacetonitrile.

EXAMPLE 1

α - *Methoxymethyl - N - methyl - β - phenylethylamine hydrochloride.*—A solution of 12.5 grams of 1-methoxy-3-phenyl-2-propanone and 15 grams of methylamine in 100 ml. of absolute ethyl alcohol was added to 0.3 gram of prereduced platinum oxide in 100 ml. of absolute ethyl alcohol and the volume made up to 300 ml. The solution was hydrogenated at 25° C. under 60 pounds pressure. Absorption was complete after five hours and the catalyst was removed by suction filtration. The solvent was removed by distillation under diminished pressure, the residual oil dissolved in 50 ml. of dry ether and treated with 15 ml. of 5.5 N ethereal hydrogen chloride. The ether was decanted and the oil layer taken up in 40 ml. of hot acetone. Addition of 20 ml. of pentane followed by cooling caused the separation of a solid product which was recrystallized from 40 ml. of acetone. There was thus obtained 9 grams of α-methoxymethyl-N-methyl-β-phenylethylamine hydrochloride, M.P. 111–113° C.

*Analysis.*—Calcd. for $C_{11}H_{18}ClNO$: C, 61.25; H, 8.41; Cl, 16.44. Found: C, 61.30; H, 8.22; Cl, 16.33.

Pharmacological evaluation of α-methoxymethyl-N-methyl-β-phenylethylamine hydrochloride in aqueous solution administered intradermally in guinea pigs according to the method of Bulbring and Wajda [J. Pharmacol. & Exptl. Therap. 85, 78 (1945)], has shown that this compound (in terms of its free base) is approximately one-half as active a local anesthetic as procaine hydrochloride. Using the trypan blue irritation test procedure described by Hoppe et al. [J. Am. Pharm. Assoc. 39, 147 (1950)], as modified by Luduena and Hoppe [J. Pharm. & Exptl. Therap. 104, 40 (1952)], this compound was found to be only about four times as irritating as procaine hydrochloride.

EXAMPLE 2

α - *Ethoxymethyl - N - methyl - β - phenylethylamine hydrochloride* was prepared from 15.8 grams of 1-ethoxy-3-phenyl-2-propanone and 10 grams of methylamine in 300 ml. of absolute ethyl alcohol according to the manipulative procedure described in Example 1. There was thus obtained 10.4 grams of white diamond-shaped plates of α - ethoxymethyl - N - methyl - β - phenylethylamine hydrochloride, M.P. 152–154° C. (corr.).

*Analysis.*—Calcd. for $C_{12}H_{20}ClNO$: C, 62.71; H, 8.77; Cl, 15.43. Found: C, 62.61; H, 8.69; Cl, 15.48.

EXAMPLE 3

α - (*n - Butoxymethyl*) - *N - methyl - β - phenylethylamine hydrochloride* was prepared from 8 grams of 1-butoxy-3-phenyl-2-propanone and 10 grams of methylamine in 250 ml. of absolute ethyl alcohol according to the manipulative procedure described above in Example 1. After recrystallization from acetone there was obtained 4.9 grams of α-(n-butoxymethyl)-N-methyl-β-phenylethylamine hydrochloride as white blade clusters, M.P. 128–130° C. (corr.).

*Analysis.*—Calcd. for $C_{14}H_{24}ClNO$: C, 65.22; H, 9.38; Cl, 13.75. Found: C, 65.07; H, 9.49; Cl, 13.72.

EXAMPLE 4

α - *n - Hexyloxymethyl - N - methyl - β - phenylethylamine hydrochloride* was prepared from 10 grams of 1-hexyloxy-3-phenyl-2-propanone and 10 grams of methylamine in 300 ml. of absolute ethyl alcohol according to the manipulative procedure described above in Example 1. After recrystallization from ethyl acetate the α-hexyloxymethyl - N - methyl - β - phenylethylamine hydrochloride was obtained as white blade clusters, M.P. 105–107° C. (corr.).

*Analysis.*—Calcd. for $C_{16}H_{27}NO$: C, 67.21; H, 9.87; Cl, 12.40. Found: C, 67.30; H, 9.60; Cl, 12.35.

EXAMPLE 5

α - *n- Octyloxymethyl - N - methyl - β - phenylamine hydrochloride* was prepared from 15.8 grams of 1-octyloxy - 3-phenyl-2-propanone and 15.8 grams of methylamine in 300 ml. of absolute ethyl alcohol according to the manipulative procedure described above in Example 1. Recrystallization from acetone gave white blade clusters of α - octyloxymethyl - N - methyl-β-phenylethylamine hydrochloride, M.P. 111–114° C. (corr.).

*Analysis.*—Calcd. for $C_{18}H_{32}ClNO$: C, 68.87; H, 10.28; Cl, 11.30. Found: C, 68.83; H, 10.16; Cl, 11.19.

Pharmacological evaluation of α-octyloxymethyl-N-methyl-β-phenylethylamine hydrochloride according to the procedures referred to in Example 1 has shown that this compound (in terms of its base) is slightly more active a local anesthetic than is procaine hydrochloride and is approximately four times as irritating.

EXAMPLE 6

α - *Cyclohexyloxymethyl - N - methyl - β - phenylethylamine hydrochloride* was prepared from 14 grams of 1-cyclohexyloxy-3-phenyl-2-propanone and 11 grams of methylamine in 300 ml. of absolute ethyl alcohol according to the manipulative procedure described above in Example 1. The white blade clusters of α-cyclohexyloxymethyl - N-methyl-β-phenylethylamine hydrochloride thus obtained had the M.P. 130–133° C. (corr.).

*Analysis.*—Calcd for $C_{16}H_{26}ClNO$: C, 67.71; H, 9.24; Cl, 12.49. Found: C, 67.50; H, 9.30; Cl, 12.46.

EXAMPLE 7

α - *Phenoxymethyl - N - methyl - β - phenylethylamine hydrochloride* was prepared from 15 grams of 1-phenoxy-3-phenyl-2-propanone and 15 grams of methylamine in 300 ml. of absolute alcohol using the manipulative procedure described above in Example 1. After recrystallization from acetonitrile there was obtained 6.4 grams of white needles of α-phenoxymethyl-N-methyl-β-phenylethylamine hydrochloride, M.P. 162–163.5° C. (corr.).

*Analysis.*—Calcd. for $C_{16}H_{20}ClNO$: C, 69.17; H, 7.26; Cl, 12.76. Found: C, 69.28; H, 7.34; Cl, 12.82.

Pharmacological evaluation of α-phenoxymethyl-N-methyl-β-phenylethylamine hydrochloride according to the procedures referred to in Example 1 has shown that this compound (in terms of its base) is twice as active a local anesthetic than is procaine hydrochloride.

EXAMPLE 8

α - *Methoxymethyl - N - methyl - β - (2 - propoxyphenyl)ethylamine hydrochloride.*—To a solution of 21 grams of 1-methoxy-3-(2-propoxyphenyl)-2-propanone in 100 ml. of absolute ethyl alcohol was added 18 grams of methylamine with cooling. This solution was then added to 0.4 gram of prereduced platinum oxide in 100 ml. of absolute ethyl alcohol and the volume made up to 300 ml. with absolute ethyl alcohol. The mixture was hydrogenated under 60 pounds pressure, the catalyst removed by suction filtration and the solvent removed by distillation at reduced pressure. Distillation of the residue gave a product, boiling at 92–97° C./0.025 mm., which was taken up in absolute ethyl ether and extracted with dilute hydrochloric acid. The aqueous layer was made strongly basic with 35% sodium hydroxide and the oil which separated was extracted with ether. Addition of ethereal hydrogen chloride to the ether solution followed by the addition of 50 ml. of n-pentane caused the separation of an oil which was dissolved in acetone. Treatment of the acetone solution with anhydrous ethyl ether precipitated a solid which was removed by suction filtration and recrystallized from a benzene-ether mixture. The 11.1 grams of α-methoxymethyl-N-methyl-β-(2-propoxyphenyl)ethylamine hydrochloride thus obtained had the M.P. 73–75° C. (corr.).

*Analysis.*—Calcd. for $C_{14}H_{24}ClNO_2$: C, 61.41; H, 8.84; Cl, 12.95. Found: C, 61.11; H, 8.88; Cl, 12.97.

Pharmacological evaluation of α-methoxymethyl-N-methyl-β-(2-propoxyphenyl)ethylamine hydrochloride according to the procedures referred to in Example 1 has shown that this compound (in terms of its base) is about as active as procaine hydrochloride and only slightly more irritating.

Other α-substituted-oxymethyl-N-lower-alkyl-β-phenylethylamines that can be prepared from 1,3-disubstituted-2-propanones and the appropriate lower-alkylamine using the procedure described above for the preparation of α-methoxymethyl-N-methyl-β-phenylethylamine include: α - (2,4 - dibromophenoxy)methyl - N - n- propyl - β - (4-hexyloxyphenyl)ethylamine by using 1 - (2,4-dibromophenoxy) - 3 - (4-n-hexyloxyphenyl)-2-propanone and n-propylamine; α-(2-methyl-5-isopropylphenoxy)methyl-N-pentyl-β-(4-chlorophenyl)ethylamine by using 1-(2-methyl - 5 - isopropylphenoxy) - 3 - (4 - chlorophenyl) - 2 - propanone and pentylamine; α - cyclopentyloxymethyl-N-ethyl - β - (3-n-butylphenyl)ethylamine by using 1-cyclopentyloxy - 3 - (3-n-butylphenyl)-2-propanone and ethylamine; α-(2,4,5-trichlorophenoxy)methyl-N-methyl-β-(2,4,6 - trimethylphenyl)ethylamine by using 1 - (2,4,5 - trichlorophenoxy) - 3 - (2,4,6 - trimethylphenyl) - 2 - propanone and methylamine; α-(4-isopropylphenoxy)methyl-N-isopropyl-β-(2,4-dibromophenyl)ethylamine by using 1 - (4 - isopropylphenoxy) - 3 - (2,4-dibromophenyl) - 2 - propanone and isopropylamine; α - (3 - chloro-4-methyl)-methyl-N-n-hexyl-β-(2-butoxyphenyl)ethylamine by using 1-(3-chloro-4-methylphenoxy)-3-(2-butoxyphenyl)-2-propanone and hexylamine; α-(4-methylphenoxy)methyl - N - isobutyl-β-(3-fluorophenyl)ethylamine by using 1-(4 - methylphenoxy)-3-(3-fluorophenyl)2-propanone and isobutylamine; α-(2-isopropylphenoxy)methyl-N-methyl-β-(4-n-pentylphenyl)ethylamine by using 1-(2-isopropylphenoxy)-3-(4-n-pentylphenyl)-2-propanone and methylamine; α - (2,6-dimethylphenoxy)methyl-N-(2-methylbutyl)-β-(2,4-dimethoxyphenyl)ethylamine by using 1-(2,6-dimethylphenoxy) - 3 - (2,4 - dimethoxyphenyl) - 2 - propanone and 2 - methylbutylamine; and α - (2-bromophenoxy)methyl - N - ethyl-β-(2-fluorophenyl)ethylamine by using 1 - (2 - bromophenoxy)-3-(2-fluorophenyl)-2-propanone with ethylamine. The phenylethylamine can be isolated in the free base form or in the form of acid-addition salts, preferably the hydrochlorides.

EXAMPLE 9

α - *Methoxymethyl - N,N - dimethyl - β - phenylethylamine hydrochloride.*—To a solution of 6.7 grams of α-hydroxymethyl-N,N-dimethyl-β-phenylethylamine in 100 ml. of toluene was added 1.68 grams of sodium hydride and the mixture refluxed for forty minutes with stirring. Dimethyl sulfate (6.3 grams) was added and reflux continued for ten minutes. The mixture was cooled, diluted with 40 ml. of water, and the resulting layers separated. The product was extracted from the organic layer with dilute hydrochloric acid and the acid extract made strongly alkaline with 35% sodium hydroxide. The liberated base was taken up in ether and this solution was treated with an ethereal solution of hydrogen chloride. The solid which separated was removed by suction filtration and recrystallized from 20 ml. of acetone. There was thus obtained white plates of α - methoxymethyl-N,N-dimethyl-β-phenylethylamine hydrochloride, M.P. 150–154° C. (corr.).

*Analysis.*—Calcd. for $C_{12}H_{20}ClNO$: Cl, 15.44; methoxy group, 13.51. Found: Cl, 15.46; methoxy group, 13.26.

Pharmacological evaluation of α-methoxymethyl-N,N-dimethyl-β-phenylethylamine hydrochloride according to the procedures referred to in Example 1 has shown that this compound (in terms of its base) is about one-half as active a local anesthetic as is procaine hydrochloride and only about twice as irritating.

EXAMPLE 10

α-*Ethoxymethyl-β-phenylethylamine hydrochloride.*—A mixture of 10 grams of 1-ethoxy-3-phenyl-2-propanone, 135 ml. of 3.5% methanolic ammonia and one-half teaspoonful of Raney nickel catalyst was subjected to 950 lbs. of hydrogen pressure at 45° C. for one hour. The catalyst was removed by gravity filtration and the solvent removed from the filtrate by distillation at reduced pressure. The residual oil was treated with ethereal hydrogen chloride then 100 ml. of pentane. The solid which separated on cooling was collected by suction filtration. After recrystallization from acetone there was obtained 6 grams of α-ethoxymethyl-β-phenylethylamine hydrochloride, M.P. 101–103° C. (corr.).

*Analysis.*—Calcd. for $C_{11}H_{18}ClNO$: C, 61.25; H, 8.41; Cl, 16.44. Found: C, 61.07; H, 8.31; Cl, 16.32.

EXAMPLE 11

α-*Isopropoxymethyl-N-methyl-β-phenylethylamine hydrochloride* was prepared from 8 grams of 1-isopropoxy-3-phenyl-2-propanone and 10 grams of methylamine in 300 ml. of absolute ethyl alcohol according to the manipulative procedure described above in Example 1. The white blade clusters of α-isopropoxymethyl-N-methyl-β-phenylethylamine hydrochloride had the M.P. 160–163° C. (corr.).

*Analysis.*—Calcd. for $C_{13}H_{22}ClNO$: C, 64.04; H, 9.10; Cl, 14.57. Found: C, 63.97; H, 9.03; Cl, 14.61.

EXAMPLE 12

α-*Isopropoxymethyl-N-(β-hydroxyethyl)-β-phenylethylamine hydrochloride* was prepared according to the manipulative procedures described above in Example 1 except that five equivalents of ethanolamine were used rather than methylamine. Thus, from 11 grams of 1-isopropoxy-3-phenyl-2-propanone and 17.4 grams of ethanolamine in 300 ml. of absolute ethyl alcohol there was obtained 4.5 grams of α-isopropoxymethyl-N-(β-hydroxyethyl)-β-phenylethylamine hydrochloride which crystallized as white needles, M.P. 94–96° C. (corr.).

*Analysis.*—Calcd. for $C_{14}H_{24}ClNO_2$: C, 61.41; H, 8.84; Cl, 12.95. Found: C, 61.08; H, 8.67; Cl, 13.01.

According to the same manipulative procedure as set forth in Example 12 there can likewise be made α-ethoxymethyl-N-(β-hydroxyethyl)-β-phenylethylamine.

Pharmacological evaluation of α-isopropoxymethyl-N-(β-hydroxyethyl)-β-phenylethylamine hydrochloride according to the procedures referred to in Example 1 has shown that this compound (in terms of its base) is about twice as active a local anesthetic as is procaine hydrochloride and about eight times as irritating.

Pharmacological evaluation of the free bases and their acid-addition salt derivatives has shown they posses local anesthetic activity and relatively low irritancies. In general, the acute toxicity of the compounds parallels their activity.

The α-$CH_2OY$-phenylethylamine derivatives can be formulated in the manner conventional for local anesthetics. For example, they can be conveniently used as their acid-addition salts, e.g., hydrochlorides, in aqueous liquid preparations. These preparations can be administered topically or injected intramuscularly or intravenously.

I claim:

1. A compound having the formula

wherein Ar is selected from the group consisting of unsubstituted phenyl and phenyl substituted by from one to three members of the group consisting of lower-alkyl, lower-alkoxy, fluorine, chlorine and bromine; Y is a member of the group consisting of alkyl radicals having from one to eight carbon atoms, cycloalkyl radicals having from five to six ring carbon atoms, phenyl and phenyl substituted by from one to three members of the group consisting of lower-alkyl, chlorine and bromine; $R_1$ is selected from the group consisting of hydrogen and lower-alkyl radicals; and $R_2$ is selected from the group consisting of hydrogen, lower-alkyl and hydroxy-lower-alkyl radicals.

2. α-Methoxymethyl-N-methyl-β-(2 - propoxyphenyl)-ethylamine.
3. α-Methoxymethyl-N,N-dimethyl-β-phenylethylamine.
4. α-Ethoxymethyl-β-phenylethylamine.
5. α-Ethoxymethyl-N-(β-hydroxyethyl)-β-phenylethylamine.
6. A compound having the formula

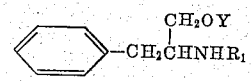

wherein Y is alkyl group having from one to eight carbon atoms and $R_1$ is a lower-alkyl group having one to six carbon atoms.

7. α-Methoxymethyl-N-methyl-β-phenylethylamine.
8. α-Isopropoxymethyl-N-methyl-β-phenylethylamine.
9. A compound having the formula

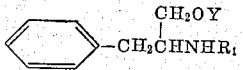

wherein Y is a cycloalkyl radical having five ring carbon atoms and $R_1$ is a lower-alkyl radical having one to six carbon atoms.

10. A compound having the formula

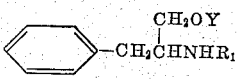

wherein Y is a cycloalkyl radical having six ring carbon atoms and $R_1$ is a lower-alkyl radical having one to six carbon atoms.

11. A compound having the formula

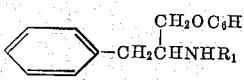

wherein $R_1$ is a lower-alkyl radical having one to six carbon atoms.

References Cited in the file of this patent

UNITED STATES PATENTS

| | | |
|---|---|---|
| 2,061,136 | Bockmuhl et al. | Nov. 17, 1936 |
| 2,597,248 | Kerwin et al. | May 20, 1952 |
| 2,695,919 | Wright et al. | Nov. 30, 1954 |
| 2,848,494 | Alberti et al. | Aug. 19, 1958 |

FOREIGN PATENTS

| | | |
|---|---|---|
| 143,635 | Austria | Nov. 25, 1935 |

OTHER REFERENCES

Cherbuliez et al.: Helv. Chem. Acta, volume 14, pages 186 to 191 (1931).

UNITED STATES PATENT OFFICE
CERTIFICATE OF CORRECTION

Patent No. 3,132,179                                May 5, 1964

Robert L. Clarke

It is hereby certified that error appears in the above numbered patent requiring correction and that the said Letters Patent should read as corrected below.

Column 6, line 44, for "phenylamine", in italics, read -- phenylethylamine --, in italics; column 7, line 68, for " -(3-chloro-4-methyl)-" read -- -(3-chloro-4-methylphenyl)- --; column 10, lines 28 to 31, for that portion of the formula reading Signed and sealed this 15th day of September 1964.

(SEAL)
Attest:

ERNEST W. SWIDER                                 EDWARD J. BRENNER
Attesting Officer                                    Commissioner of Patents